US012608356B1

(12) United States Patent
Chen et al.

(10) Patent No.: US 12,608,356 B1
(45) Date of Patent: Apr. 21, 2026

(54) HYBRID VECTOR DATABASE

(71) Applicant: eBay Inc., San Jose, CA (US)

(72) Inventors: Hao Chen, Santa Clara, CA (US); Sami Ben Romdhane, Los Altos, CA (US); Navaneetha Krishnan Thanka Nadar, Seattle, WA (US); Venkata R. Yella, Saratoga, CA (US); Yuri L. Finkelstein, San Carlos, CA (US); Viswa Prasad Vutharkar, Roseville, CA (US); Yongwei Lu, Cupertino, CA (US); Erfan Zamanian Dolati, San Jose, CA (US); Mingda Sun, Ontario (CA); Souhaila Moalla, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/991,270

(22) Filed: Dec. 20, 2024

(51) Int. Cl.
| | |
|---|---|
| *G06F 16/00* | (2019.01) |
| *G06F 16/22* | (2019.01) |
| *G06F 16/28* | (2019.01) |
| *G06F 16/901* | (2019.01) |

(52) U.S. Cl.
CPC ........ *G06F 16/2237* (2019.01); *G06F 16/285* (2019.01); *G06F 16/9024* (2019.01)

(58) Field of Classification Search
CPC ........ G06F 8/60; G06F 9/547; G06F 11/3433; G06F 16/215; G06F 12/128; G06F 17/18; G06F 8/20; G06F 40/106; G06F 40/143; G06F 40/166; G06F 16/245; G06F 16/172; G06F 16/28; G06F 16/285; G06F 16/13; G06F 2212/454; G06F 16/21; H04L 41/16; H04L 67/04; H04L 41/122; H04L 41/142; H04L 43/08; H04L 41/149; G06N 20/00; G06N 3/044; G06N 3/045; G06N 3/08; G06N 3/084; G06N 3/09
See application file for complete search history.

(56) References Cited

U.S. PATENT DOCUMENTS

| | | | | |
|---|---|---|---|---|
| 12,393,634 | B1 * | 8/2025 | Ferhatosmanoglu | ........................ G06F 16/2237 |
| 2025/0038766 | A1 * | 1/2025 | Leblanc | .............. H03M 7/3059 |

OTHER PUBLICATIONS

Mills, Jule, "How Rockset Built Vector Search for Scale in the Cloud", [retrieved from the internet on Feb. 26, 2025], <https://rockset.com/blog/vector-search-scale/>, Nov. 7, 2023, 10 pages.
Milvus, "What is Milvus", [retrieved from the internet on Feb. 26, 2025], <https://milvus.io/docs/overview.md., 2024, 7 pages.
Pinecone Docs, "Serverless architecture", [retrieved from the internet on Feb. 26, 2025], <https://docs.pinecone.io/reference/architecture/serverless-architecture#index-builder):>, 2024, 6 pages.

* cited by examiner

*Primary Examiner* — Shyue Jiunn Hwa
(74) *Attorney, Agent, or Firm* — FIG. 1 Patents

(57) ABSTRACT

In accordance with the described techniques, vector data to be inserted into a vector database is obtained. The vector data is indexed into a mutable index of the vector database that supports real-time vector indexing. Periodically, the vector data is merged from the mutable index into one or more immutable graph-based indexes. A query vector is received, and a vector search is performed in the mutable index and the one or more graph-based immutable indexes based on the query vector.

20 Claims, 7 Drawing Sheets

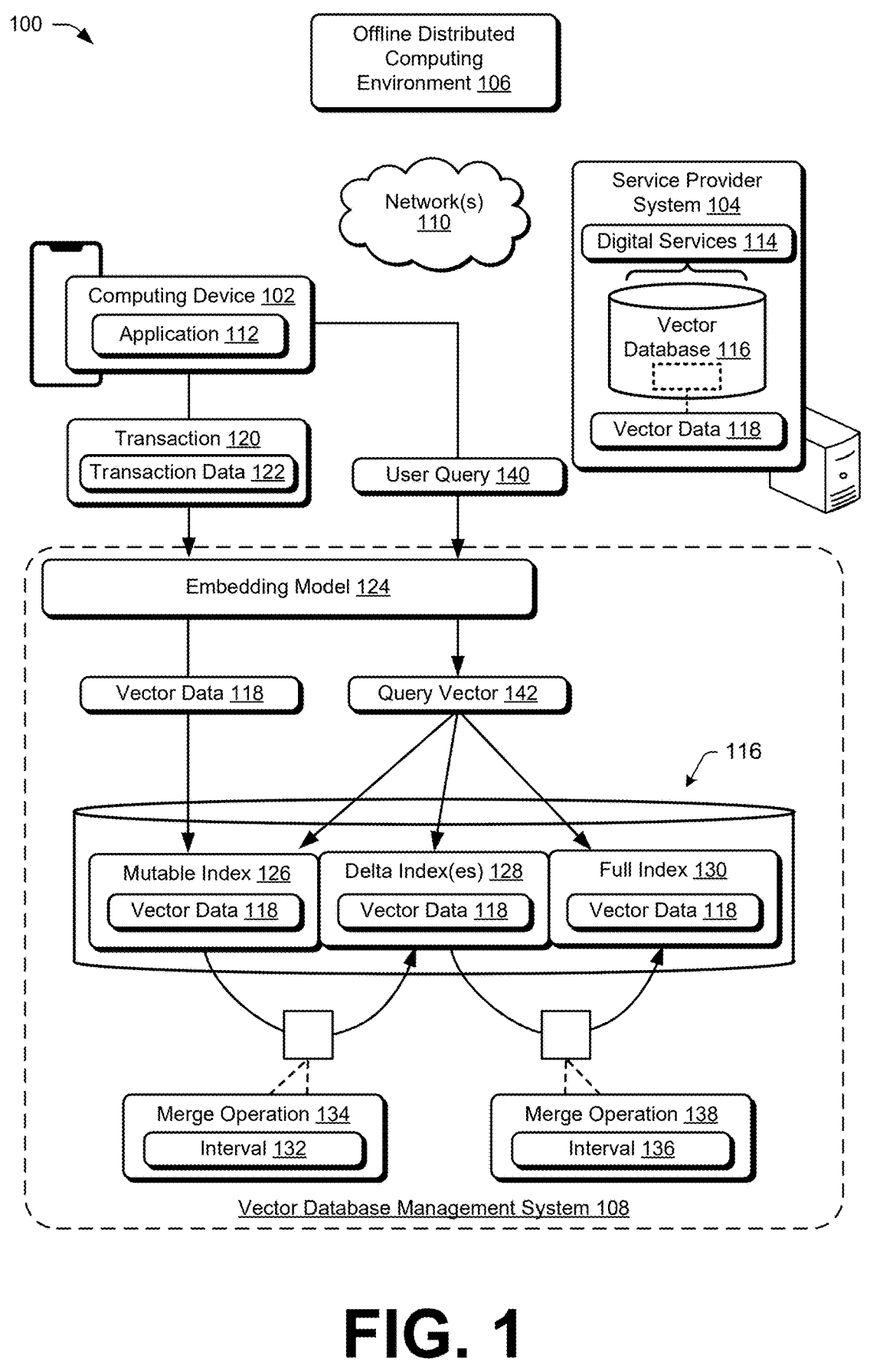

100 ⟶

Offline Distributed
Computing
Environment 106

Network(s)
110

Service Provider
System 104

Digital Services 114

Vector
Database 116

Vector Data 118

Computing Device 102

Application 112

Transaction 120

Transaction Data 122

User Query 140

Embedding Model 124

Vector Data 118

Query Vector 142

⟋ 116

Mutable Index 126

Vector Data 118

Delta Index(es) 128

Vector Data 118

Full Index 130

Vector Data 118

Merge Operation 134

Interval 132

Merge Operation 138

Interval 136

Vector Database Management System 108

FIG. 1

500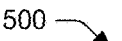

<div style="border:1px solid">

502
Obtain vector data to be inserted into a vector database

</div>

↓

<div style="border:1px solid">

504
Index the vector data into a mutable index of the vector database that supports real-time vector indexing </div>

↓

<div style="border:1px solid">

506
Periodically merge the vector data from the mutable index into one or more immutable graph-based indexes </div>

↓

<div style="border:1px solid">

508
Receive a query vector

</div>

↓

<div style="border:1px solid">

510
Perform a vector search in the mutable index and the one or more immutable graph-based indexes based on the query vector </div>

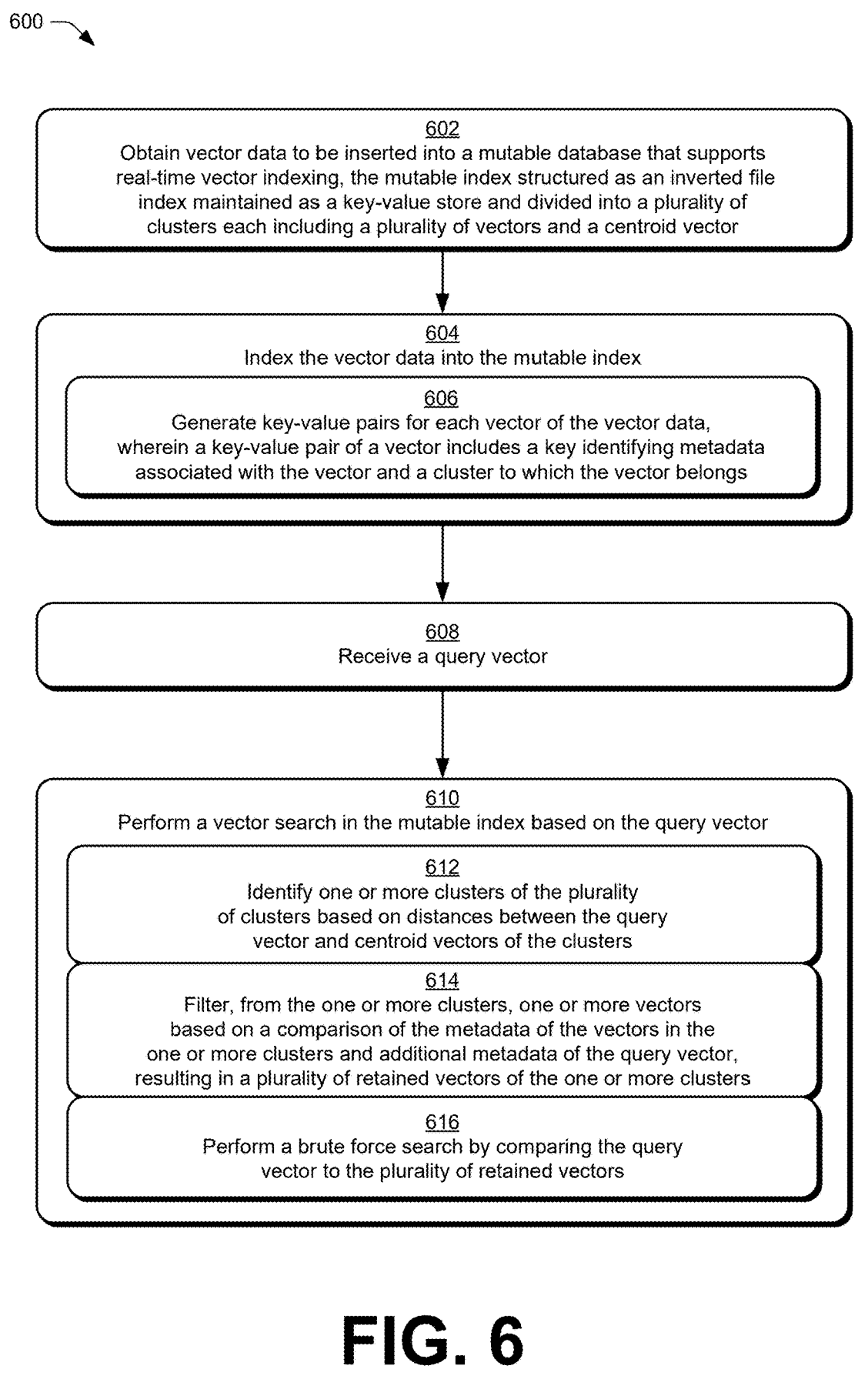

602
Obtain vector data to be inserted into a mutable database that supports real-time vector indexing, the mutable index structured as an inverted file index maintained as a key-value store and divided into a plurality of clusters each including a plurality of vectors and a centroid vector

604
Index the vector data into the mutable index

606
Generate key-value pairs for each vector of the vector data, wherein a key-value pair of a vector includes a key identifying metadata associated with the vector and a cluster to which the vector belongs

608
Receive a query vector

610
Perform a vector search in the mutable index based on the query vector

612
Identify one or more clusters of the plurality of clusters based on distances between the query vector and centroid vectors of the clusters

614
Filter, from the one or more clusters, one or more vectors based on a comparison of the metadata of the vectors in the one or more clusters and additional metadata of the query vector, resulting in a plurality of retained vectors of the one or more clusters

616
Perform a brute force search by comparing the query vector to the plurality of retained vectors

FIG. 6

700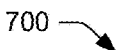
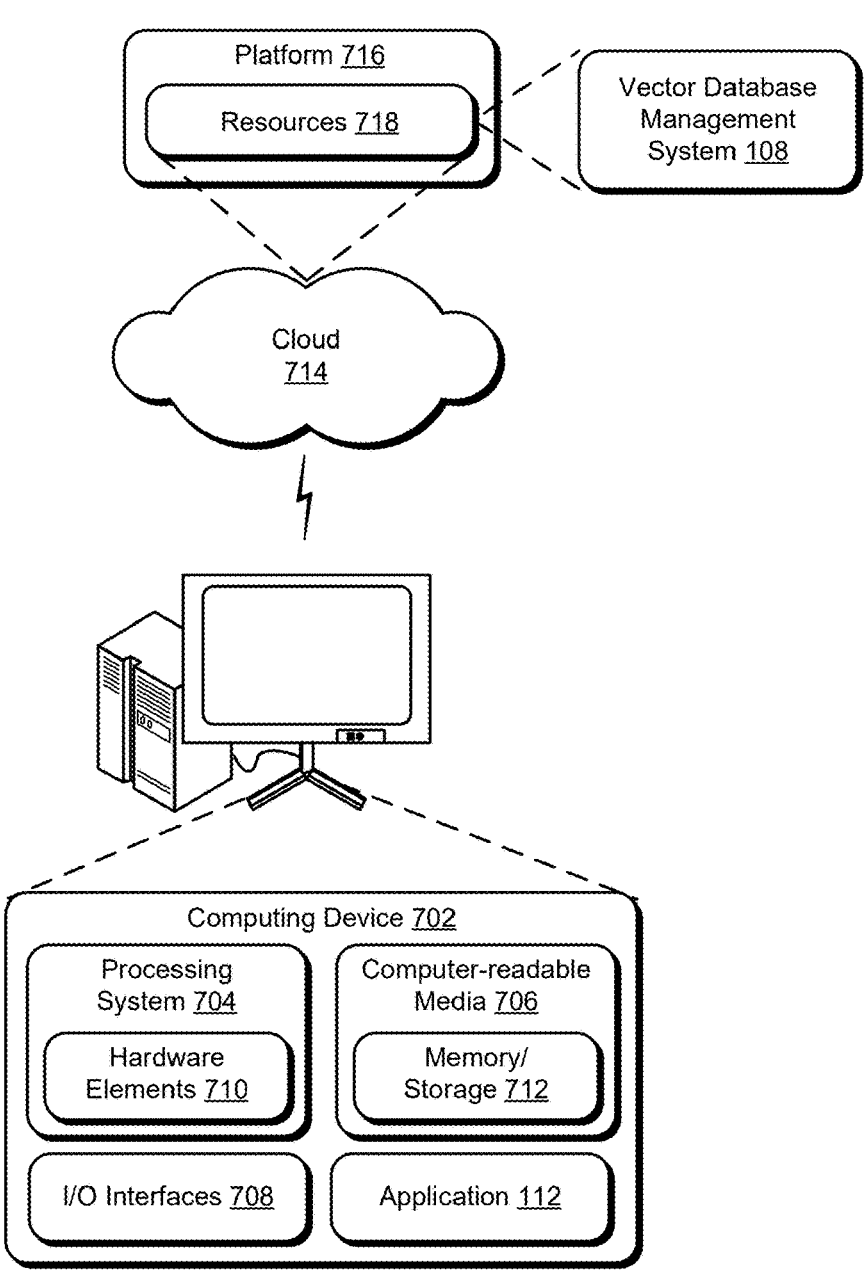
FIG. 7

HYBRID VECTOR DATABASE

BACKGROUND

Databases enable efficient storage and retrieval of data to support various applications and services. Traditional databases typically store structured data in tables with predefined schemas. However, as data becomes more complex and unstructured, new database paradigms have emerged. Vector databases represent one such paradigm that allows for storage and querying of high-dimensional vector data. These databases can capture complex relationships and contextual information by representing data as numerical vectors in a multi-dimensional space. Vector databases may support applications such as image recognition, natural language processing, and recommendation systems. To enable efficient searching of vector data, these databases often employ specialized indexing techniques and search algorithms. The choice of indexing technique often involves tradeoffs between factors like query speed, index building time, and memory usage.

SUMMARY

A vector database management system is configured to manage indexing and searching of a vector database. As part of this, the vector database management system obtains vector data to be inserted into a mutable index (e.g., an inverted file (IVF) index maintained as a key-value (KV) store) of the vector database that supports real-time vector indexing. Periodically, the vector database management system merges the vector data into one or more immutable graph-based indexes, e.g., Hierarchical Navigable Smaller World (HNSW) indexes. The merging operations, for instance, involve storage of vector data and performance of index build jobs to build the one or more immutable graph-based indexes at an offline distributed computing environment. Upon receiving a query vector, the vector database management system performs a vector search in the mutable index and the one or more immutable graph-based indexes based on the query vector.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 1 is an illustration of an environment in an example implementation that is operable to employ techniques described herein.

FIG. 5 depicts a procedure in an example implementation of real-time vector indexing and searching in a mutable index and one or more immutable graph-based indexes.

FIG. 6 illustrates a procedure in an example implementation of real-time vector indexing and searching in a mutable index.

FIG. 7 illustrates an example of a system that may implement the various techniques described herein.

DETAILED DESCRIPTION

Overview

Figure 2:
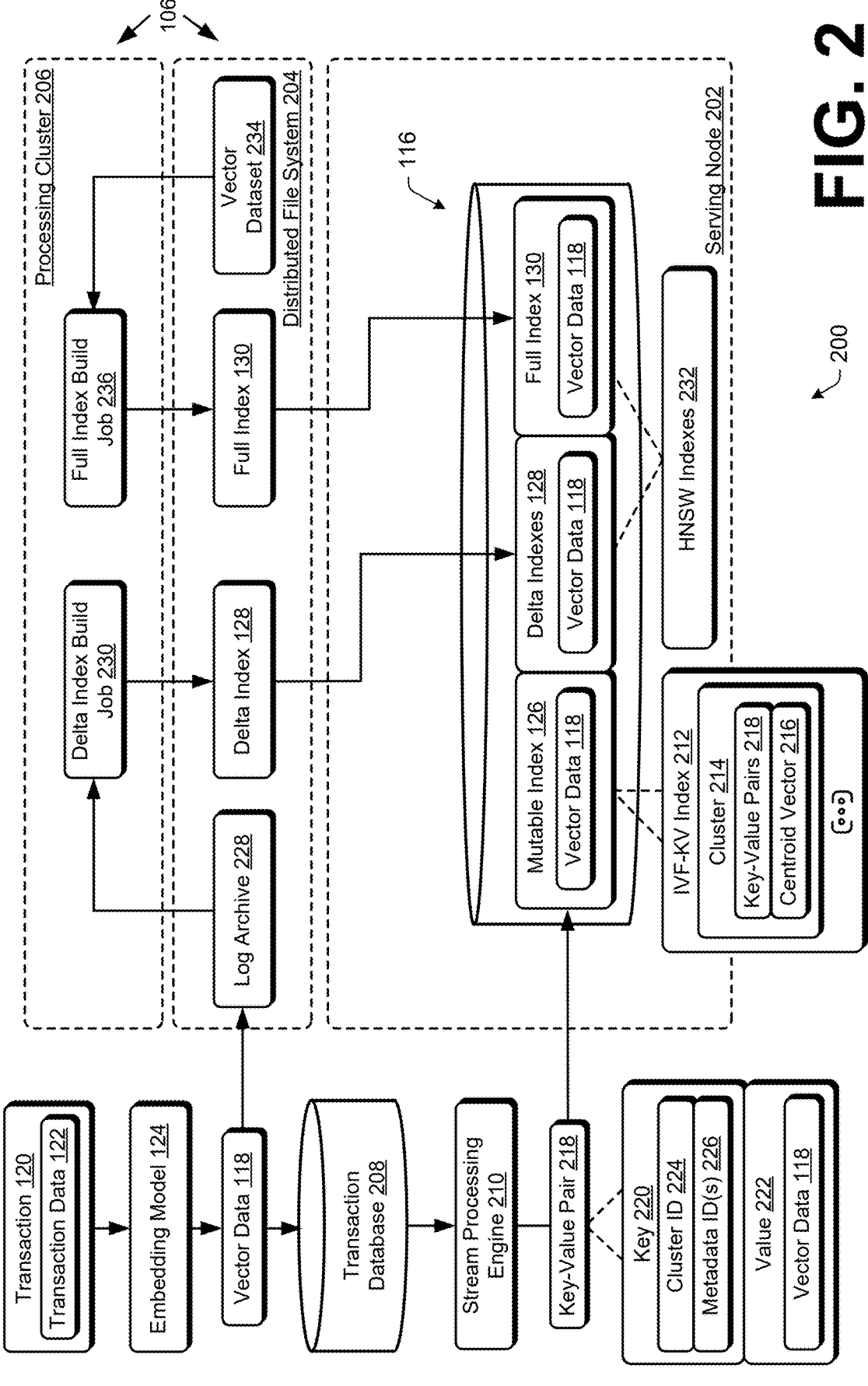
FIG. 2 depicts a system for indexing a vector database in accordance with the described techniques.

Conventional vector indexing techniques often struggle to balance real-time indexing capabilities with efficient search performance at scale. Traditional approaches typically rely on either mutable indexes that support fast updates but suffer from degraded search performance as the dataset grows, or immutable indexes that offer fast search times but lack real-time update capabilities. These limitations in conventional techniques have created a significant challenge in the field of vector databases, where there is a growing need for solutions that can handle both real-time data indexing and efficient searching of large-scale datasets. Current solutions involve a trade-off between indexing speed and search performance, making it difficult to achieve both low-latency searches and real-time updates within a single, large-scale vector database system.

To address these limitations, a hybrid vector database is described that includes a mutable index that supports real-time vector indexing, and one or more immutable graph-based indexes that support low-latency vector searches at scale. In some examples, the mutable index is constructed as an inverted file (IVF) index, which supports real-time vector indexing. However, as the number of vectors in an IVF index increases, so too does the search latency, limiting the effectiveness of an IVF index for large-scale vector search applications. On the other hand, the immutable graph-based indexes are constructed as Hierarchical Navigable Small World (HNSW) indexes, which provide low latency search performance on large datasets but are immutable by nature. Updating an HNSW index involves rebuilding the entire structure, which is a time-consuming process that prevents real-time updates.

In accordance with the described techniques, a hybrid vector database system is configured to manage indexing and searching the hybrid vector database. As part of this, the vector database management system receives a transaction including transaction data to be indexed in the vector database. This transaction data is processed by an embedding model, which generates vector data (e.g., a vector) representing the transaction in a high-dimensional vector space. In various examples, the transaction data includes multimodal (e.g., image, video, audio, text) content, and the embedding model is capable of processing and representing multimodal content in a common embedding space. Consider an example in which the hybrid vector database is implemented as part of an online marketplace storing vector representations of item listings. In this example, a transaction can be an item being listed or an existing item listing being updated, the transaction data can be the item listing (e.g., including images of the item, a title of the item, a description of the item, categories of the item, and so on), and the vector data can be a vector representation of the item listing.

In one or more implementations, the vector database management system indexes the vector data into a mutable index of the vector database that supports real-time vector indexing. In one or more implementations, the mutable index is structured as an inverted file (IVF) index maintained as a key-value (KV) store. As part of this, the IVF index is divided into clusters, each containing multiple vectors and a centroid vector representing the cluster's center.

During the indexing process, a transaction (along with the vector data and/or the non-vector transaction data) is logged in a transaction database. In various implementations, the mutable index and the transaction database are configured with a same indexing structure, e.g., a B-tree index. The vector database management system consumes the transaction from the log, and encodes the vector data into a key-value pair. For instance, the key includes a cluster identifier specifying a cluster to which the vector data belongs and metadata identifier(s) specifying metadata (e.g., an item category of the item listing, and/or a regional website to which the item listing is published) associated with the vector data. The value of the key-value pair is the vector data itself. Once encoded, a key-value pair is indexed into the mutable index, and inserted into a cluster identified by the cluster identifier. This indexing process is repeated on a plurality of transactions to build the mutable index.

Periodically, the vector database management system merges the vector data from the mutable index into the one or more graph-based immutable indexes, e.g., HNSW indexes. In various implementations, the one or more graph-based immutable indexes include one or more delta indexes and a full index. The merging process involves periodically, in accordance with a first interval, merging the mutable index into the one or more delta indexes. As part of this, the vector database management system maintains a log archive, which contains a record of all transactions and their corresponding vector data having been processed since the last merge operation of the mutable index into the delta indexes. The log archive is stored in a distributed file system of an offline distributed computing environment. Furthermore, a processing cluster of the offline distributed computing environment processes the log archive to build a new delta (e.g., HNSW) index. Once the delta index is built, the mutable index and the log archive are cleared, and the new delta index is loaded into the hybrid vector database. This process is repeated iteratively in accordance with the first interval.

The merging process also involves periodically, in accordance with a second interval (e.g., typically longer than the first interval), merging the delta indexes into the full index. As part of this, a vector dataset is maintained by the distributed file system, which contains a unified dataset of all the vector data indexed by the hybrid vector database. The processing cluster processes the vector data set to build a new full (e.g., HNSW) index. Once built, the mutable index and the delta indexes are cleared, and the newly created full delta index replaces an existing full index of the hybrid vector database.

When a user query is received, it is processed by the embedding model to generate a query vector. A serving node of the system then performs a vector search concurrently in the mutable index, the delta indexes, and the full index based on this query vector. In the mutable index, the vector search involves identifying relevant clusters based on the distances between the query vector and the centroid vectors. Furthermore, the vector database management system filters, from the identified relevant clusters, vectors within these clusters based on metadata. This filtering process involves, for example, comparing metadata of the query vector to the metadata identifiers encoded in the keys associated with the vectors, and retaining the vectors that have metadata identifiers matching the metadata of the query vector. Moreover, the vector database management system performs a brute force search on the retained vectors within the identified clusters. For the HNSW (delta and full) indexes, the vector search involves performing an approximate nearest neighbors (ANN) search in the HNSW indexes, in part, by traversing through the graph structures to find the nearest neighbors efficiently.

The vector database management system then aggregates the search results from all indexes, combining and ranking them i to produce a comprehensive set of nearest neighbors for the query vector. The corresponding non-vector data (e.g., item listings in an online marketplace context) is retrieved and returned as search results, which are then output to the user through an application interface.

Thus, the described techniques relate to a hybrid vector database system that combines a mutable index for real-time indexing with immutable graph-based indexes for efficient searching at scale. By employing this hybrid approach, the system enables immediate or near-immediate searchability of newly added vector data while maintaining low search latency even as the dataset grows to billions of vectors. This hybrid approach overcomes the limitations of traditional systems that involve a trade-off between indexing speed and search performance. By enabling both low-latency searches and real-time updates within a single, large-scale vector database system, the described techniques improve search latency and scalability of vector search applications across various domains, including image search, natural language processing, and recommendation systems.

Moreover, the described techniques separate the indexing and searching workloads. As part of this, computationally intensive indexing tasks for the immutable graph-based indexes are offloaded to an offline distributed computing environment. In contrast, low-cost real-time indexing operations and search operations are performed by a serving node of the system. The computational cost associated with the indexing operations is kept low, in part, by structuring the mutable index and the transaction database with the same indexing structure. This consistency significantly reduces the computational overhead typically associated with data transformation and reorganization during the indexing process, allowing for a faster transfer of data when indexing. By separating the indexing and searching workload in this manner, the serving node can focus on maintaining low-latency search performance, while leveraging the scalability of the offline distributed computing environment to build the HNSW indexes without impacting search performance.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a computing device 102, a service provider system 104, an offline distributed computing environment 106, and a vector database management system 108. In one or more implementations, the computing device 102, the service provider system 104, the offline distributed computing environment 106, and the vector database management system 108 are communicatively coupled, one to another, via network(s) 110. One example of the network(s) 110 is the Internet, although one or more of the computing device 102, the service provider system 104, the offline distributed computing environment 106, and the vector database management system 108 may be communicatively coupled using one or more different connections or different networks in various implementations.

Although the vector database management system 108 is depicted in the environment 100 as being separate from the computing device 102, the service provider system 104, and the offline distributed computing environment 106 in one or more implementations, an entirety or various portions of the vector database management system 108 are implemented at or by the computing device 102, the service provider system 104, and/or the offline distributed computing environment 106. In at least one implementation, for example, at least a portion of the vector database management system 108 is implemented by an application 112 of the computing device 102 and/or using various resources of the computing device 102, such as hardware resources, an operating system, firmware, and so forth. Alternatively or additionally, at least a portion of the vector database management system 108 is implemented by resources (e.g., server-based storage, processing, and so on) of the service provider system 104. Alternatively or additionally, at least a portion of the vector database management system 108 is implemented using the offline distributed computing environment 106.

The offline distributed computing environment 106 is a large-scale data processing system implemented to handle vector indexing and searching operations at scale. In the context of the described techniques, the offline distributed computing environment 106 employs parallel processing techniques across a plurality of machines to efficiently build and update vector indexes. The offline distributed computing environment 106 may utilize frameworks such as Apache Spark, Apache Kafka, and the Hadoop Distributed File System (HDFS) to distribute computational tasks and manage data storage. The offline distributed computing environment 106 is "offline" in the sense that computational and data storage tasks are performed by hardware and/or computing resources owned and/or controlled by the offline distributed computing environment 106, rather than the service provider system 104 to support provision of services (e.g., web services) by the service provider system 104. In other words, the vector database management system 108 leverages the vast scalability of the offline distributed computing environment 106 by offloading certain computational and data storage tasks to be performed by the offline distributed computing environment 106.

Computing devices that implement the environment 100 (e.g., the computing device 102, the service provider system 104, the offline distributed computing environment 106, and/or the vector database management system 108) are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an AR/VR device (e.g., the smart glasses), a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm or data center utilized to perform operations "over the cloud" as further described in relation to FIG. 7.

In at least one implementation, the application 112 supports communication of data across the network(s) 110, such as between the computing device 102 and any one or any combination of the service provider system 104, the offline distributed computing environment 106, and the vector database management system 108. By supporting such data communication, the application 112 provides a respective user of the computing device 102 (and users of other interconnected client devices) access to digital services 114. For example, the computing device 102 receives data from the service provider system 104. Based on the received data, the application 112 causes various systems of the computing device 102 to output user interfaces of the digital services 114, such as by displaying user interfaces via display devices or making accessible voice-based user interfaces.

Digital services 114 can take a variety of forms in the context of vector database searching. Examples of digital services 114 that may implement the described vector search and indexing techniques include online marketplace services, product recommendation systems, image similarity search services, semantic search engines, and natural language processing applications. These digital services 114 can leverage a vector database 116 to enable efficient similarity searches and nearest neighbor queries on high-dimensional vector data.

The vector database 116 is a database system configured to store and index vector data 118, e.g., vectors, embeddings, and the like. The vector database 116 supports storing, indexing, and efficiently searching vector data. Vector databases 116 offer advantages over traditional databases by representing data as high-dimensional vectors, enabling more nuanced similarity-based searches that capture complex relationships and contextual information, which can provide more accurate and relevant search results for tasks like natural language processing and image recognition. Additionally, vector databases 116 allow for efficient approximate nearest neighbor searches on large-scale datasets, thereby improving query times and scalability.

Common use cases for vector search using the vector database 116 include, but are not limited to including, image search, retrieval augmented generation (RAG), and item recommendation. In accordance with image vector search, the vector data 118 includes image embeddings, and an input image is received and converted (e.g., using an embedding model) to a query vector. Further, the query image is compared to the image embeddings in the vector database 116 to identify similar images to the input image, e.g., those having vector representations that are close to the query vector in an embedding space. In accordance with RAG, a user query (e.g., a question) is received and converted to a query vector (e.g., using an embedding model), and similar vectors to the query vector are identified from the vector database 116. The query vector and similar vectors are provided to a large language model (LLM) or AI-powered chatbot to answer the user query, with a context that is supplemented by the identified similar vectors. In accordance with item recommendation, the vector database 116 maintains vector data 118 in the form of item vectors defining listings for items on an online marketplace, and profile embeddings defining interests and/or user data of a user profile on the online marketplace, e.g., based on user behavior on the website, such as clicks, purchases, views, interests, and the like. Here, when a user accesses the online marketplace, recommended items are surfaced in user interface, such that the recommended items are those associated with item vectors that are similar (e.g., close in an embedding space) to a profile embedding of the user.

Through interaction of a user with the computing device 102, the application 112 receives user input via one or more user interfaces of the digital services 114. Examples of such input include, but are not limited to, receiving touch input in relation to portions of a displayed user interface, receiving one or more voice commands, receiving typed input (e.g., via a physical or virtual ("soft") keyboard), receiving mouse or stylus input, and so forth. One example of the application 112 is a browser, which is operable to navigate to a website of the digital services 114, display pages of the website, and facilitate user interaction with web pages of the website. Another example of the application 112 is a web-based computer application of the digital services 114, such as a mobile application or a desktop application. The application 112 may be configured in different ways, which enable users to interact with their computing devices and by extension perform actions with respect to the digital services, without departing from the spirit or scope of the techniques described herein.

One such action is to initiate a transaction 120, which is any action that causes a change in the vector database 116. That is, a transaction 120 is any action that changes, updates, and/or adds the type of data (e.g., transaction data 122) that is indexed and stored in the vector database 116. In the context of an image search system, for example, the transaction 120 can be a user publishing an image via the image search system, and the transaction data 122 is the published image. In the context of an online marketplace that stores and indexes item listings in the vector database 116, the transaction 120 can be a user publishing a listing via the online marketplace, and the transaction data 122 includes listing data, e.g., image(s) of the listing, a title of the listing, descriptions of the listed item, categories of the listed item, and so on.

As shown, the transaction 120 is provided to the vector database management system 108, which is generally representative of functionality for storing, indexing, and searching vector data 118 in the vector database 116. As part of this, the transaction data 122 is processed by an embedding model 124. Generally, the embedding model 124 is a machine learning model configured to process transaction data 122 and generate vector data 118 (e.g., vector representations, or embeddings) that capture semantic or contextual information about the transaction data 122. The embedding model 124 is capable of processing multimodal content, including images, audio, video, and text, to generate corresponding vector representations representing the data in a common embedding space. Examples of the embedding model 124 include, but are not limited to, convolutional neural network (CNN) models (e.g., ResNet or Efficient-Net), transformer-based models (e.g., Bidirectional Encoder Representations from Transformers (BERT) or its variants), Wav2Vec models, Contrastive Language-Image Pre-Training (CLIP) models. The choice of embedding model(s) 124, however, depends on the specific requirements of the application and the nature of the data being processed.

As shown, the vector database 116 includes a mutable index 126, one or more delta indexes 128, and a full index 130. In one or more implementations, the delta indexes 128 and the full index 130 are implemented as graph-based immutable indexes. In one or more implementations, the graph-based immutable indexes are implemented as Hierarchical Navigable Small World (HNSW) indexes, which excel at approximate nearest neighbor (ANN) search as implemented by the vector database management system 108. These graph-based immutable indexes support fast (millisecond-level) searches on very large datasets (e.g., they are efficiently searchable on databases having billions of entries), and as such, are highly scalable. However, the graph-based immutable indexes are "immutable" in the sense that the indexes do not support direct modifications or updates after their initial creation. Instead, updating an immutable index involves creating a new version of the index that includes updated data, rather than updating the existing one in-place. Due to this, the index building time of these graph-based immutable indexes is relatively slow.

In contrast, the mutable index 126, in various implementations, is implemented as an inverted file (IVF) index, explained in more depth below with reference to FIG. 2. The mutable index 126 supports real-time vector indexing and/or real-time mutation. That is, the process of updating the mutable index 126 to include new or updated vector data 118 occurs with minimal latency. For example, the latency between ingestion (e.g., when new vector data 118 is received by the system 108) and indexing (e.g., when the vector data 118 is inserted in the mutable index 126 in the proper format and available for searching) is immediate or near-immediate, e.g., within ten seconds. However, the mutable index 126 lacks the scalability of the graph-based immutable indexes in the context of search latency. By way of example, the mutable index 126 exhibits acceptable search latency (e.g., below fifty milliseconds) when the amount of data inside the mutable index 126 is below a threshold. However, the search latency exceeds an acceptable duration when the amount of data inside the mutable index is above the threshold.

As shown, the vector database management system 108 receives the transaction, and the embedding model 124 encodes the transaction data 122 as vector data 118. In response, the vector database management system 108 indexes the vector data 118 in the mutable index 126. This process is repeated for each transaction 120, thereby causing the mutable index 126 to grow in size (e.g., store more and more vector data 118) over time.

Periodically, in accordance with a first interval 132, the vector database management system 108 is configured to perform a merge operation 134 to merge the vector data 118 in the mutable index 126 to the delta index(es) 128. In one or more implementations, the merge operation 134 involves building a new delta index 128 (e.g., an HNSW index) on the vector data 118 accumulated in the mutable index 126 since a previous interval 132. Furthermore, the merge operation 134 includes clearing the vector data 118 inside the mutable index 126 once the new delta index 128 is built. The interval 132 can be time-based or size/memory based. In one or more implementations, for instance, the vector database management system 108 triggers the merge operation 134 based on a time interval (e.g., every ten minutes), or when the mutable index 126 grows to a predefined size, e.g., one million entries.

Periodically, in accordance with a second interval 136, the vector database management system 108 is configured to perform a merge operation 138 to merge the vector data 118 in the delta index(es) 128 to the full index 130. In one or more implementations, the merge operation 134 involves building a new full index 130 (e.g., an HNSW index) on the vector data 118 accumulated in the delta index(es) 128 since a previous interval 136. Furthermore, the merge operation 138 includes deleting the delta index(es) 128 and/or clearing the vector data 118 therein once the full index 130 is built. Similar to the interval 132, the interval 136 can be time-based or size/memory based. For example, the vector database management system 108 triggers the merge operation 134 based on a time interval (e.g., every twenty-four hours), when the delta index(es) 128 grow to a predefined size (e.g., ten million entries), or a predefined number of delta indexes 128 have been built.

As part of a searching process to search the vector database 116, the vector database management system 108 receives a user query 140. For example, a user of the computing device 102 submits the user query 140 via interaction with user interface(s) of the application 112. In various implementations, the user query 140 includes multimodal content, e.g., images, video, text, and/or audio. Furthermore, the embedding model 124 encodes the user query 140 as a query vector 142, in accordance with the described techniques. The vector database management system 108 is configured to perform a vector search in the vector database 116 based on the query vector 142. In particular, the vector database management system 108 concurrently searches the mutable index 126, the delta index(es) 128, and the full index 130, as shown. As part of this, the vector database management system 108 identifies vectors of the vector data 118 that are proximate to the query vector 142 in the embedding space. Moreover, the vector database management system 108 obtains non-vector data corresponding to the identified vectors (e.g., images corresponding to the identified vectors in an image search setting), and returns the non-vector data to the computing device 102 as search results. The search results are output (e.g., for display) at the computing device 102, e.g., in a user interface of the digital services 114.

Conventional vector indexing techniques often struggle to balance real-time indexing capabilities with efficient search performance at scale. Traditional approaches typically rely on either mutable indexes that support fast updates but suffer from degraded search performance as the dataset grows, or immutable indexes that offer fast search times but lack real-time update capabilities. For instance, mutable indexes like IVF indexes allow for quick updates and insertions, making them suitable for real-time indexing. However, as the number of vectors in an IVF index increases, search latency grows, limiting the effectiveness of the IVF index for large-scale vector search applications. On the other hand, graph-based indexes like Hierarchical Navigable Small World (HNSW) provide excellent search performance on large datasets but are immutable by nature. Updating an HNSW index requires rebuilding the entire structure, which is a time-consuming process that prevents real-time updates.

The described techniques address these limitations by implementing a hybrid indexing approach that combines the strengths of both mutable and immutable graph-based indexes. By utilizing the mutable index 126 (e.g., an IVF index) for real-time vector indexing, the system 108 enables immediate or near-immediate searchability of newly added vector data 118. This mutable index 126 supports high-throughput, low-latency updates, allowing for real-time vector indexing with minimal delay between data ingestion and search availability. Concurrently, the system 108 periodically merges the vector data 118 from the mutable index 126 into immutable graph-based (e.g., HNSW) indexes through a series of merge operations 134, 138. This process involves creating delta indexes 128 at regular intervals and eventually merging these delta indexes 128 into a full index 130. By leveraging the scalability and search efficiency of graph-based indexes, the system 108 maintains low search latency even as the dataset grows, e.g., to billions of vectors.

This hybrid approach offers several computational and practical advantages. First, it enables real-time indexing and immediate or near immediate searchability of new data, which is crucial for applications requiring up-to-date search results. Second, by periodically merging data into the graph-based immutable indexes, the system 108 preserves efficient search performance on large-scale datasets. That is, the periodic merging enables the amount of data in the mutable index 126 to be sufficiently small to facilitate acceptable search latency, e.g., under fifty milliseconds. Furthermore, the structure of the graph-based immutable indexes allow for efficient search latency at scale. Thus, the described vector indexing and search techniques represent an improvement over conventional techniques, by enabling real-time indexing and maintaining low search latency at scale.

FIG. 2 depicts a system 200 for indexing a vector database in accordance with the described techniques. As shown, the system 200 includes a serving node 202 (of the service provider system 104) as well as a distributed file system 204 and a processing cluster 206. In accordance with the described techniques, indexing operations, storage tasks, and processing tasks are distributed for performance by the serving node 202, the distributed file system 204, and the processing cluster 206.

The serving node 202 is a computing device or system of the service provider system 104 responsible for handling real-time vector indexing and search operations within the system 200. It can be implemented using various hardware configurations, such as dedicated server machines, cloud-based virtual machines, or edge computing devices.

The distributed file system 204 is a storage system designed to manage and store large volumes of data across multiple machines. It provides a scalable and fault-tolerant storage solution for the vector database 116, enabling efficient storage and retrieval of vector data and associated metadata. The distributed file system 204 can be implemented using various technologies, such as the Hadoop Distributed File System (HDFS), Google File System (GFS), or cloud-based object storage services like Amazon S3 or Google Cloud Storage.

The processing cluster 206 is a group of interconnected computers or servers that work together to perform large-scale data processing tasks, such as building and updating the immutable graph-based indexes. It leverages parallel processing techniques to efficiently handle computationally intensive operations on vast amounts of vector data. The processing cluster 206 can be implemented using frameworks like Apache Spark, Apache Flink, or Google Cloud Dataflow, which provide distributed computing capabilities for batch and stream processing. These frameworks allow for the efficient execution of complex algorithms and data transformations required for building and maintaining the delta indexes 128 and full index 130.

In the system 200, a transaction 120 is received by an embedding model 124, which processes the transaction data 122 of the transaction 120 to produce vector data 118, e.g., a vector representation of the transaction data 122. Furthermore, the vector data 118 is stored in a transaction database 208, which is a storage system, separate from the serving node 202, designed to store and manage transaction data 122 and corresponding vector data 118. In various implementations, the transaction database 208 is implemented by the service provider system 104 and/or the offline distributed computing environment 106. The transaction logging process is repeated for a plurality of transactions 120 as received from a plurality of computing devices 102 via interaction with the digital services 114, resulting in a transaction log maintained in the transaction database 208. Each transaction 120 of the transaction log includes the transaction data 122 and the corresponding vector data 118 generated therefrom.

The system 200 is illustrated as including a stream processing engine 210, which is a data processing system designed to handle and transform continuous streams of data in real-time or near real-time. In accordance with the described techniques, the stream processing engine 210 functions to consume the transaction log from the transaction database 208 and convert the data into a format that is indexable into the mutable index 126 by the serving node 202. The stream processing engine 210 can be implemented using various technologies and frameworks, examples of which include Apache Kafka Streams, Apache Flink, Apache Storm, or Apache Samza. These technologies offer different features and optimizations for handling high-throughput, low-latency data streams.

In the system 200, the mutable index 126 is an inverted file index (IVF) maintained as a key-value (KV) store, or in other words, the mutable index 126 is an IVF-KV index 212. In accordance with the described techniques, an IVF index is a data structure that organizes the vector data 118 into clusters 214. Each cluster 214 includes the vector data 118 of a plurality of vectors, and a centroid vector 216 that defines a center of the cluster 214 in the vector space. In various implementations, the centroid vectors 216 are initialized by running a k-means clustering algorithm on the vectors of the vector data 118 maintained in the mutable index 126. In at least one example, the k-means algorithm is processed by a processing cluster 206 (e.g., an Apache Spark cluster) of the offline distributed computing environment 106.

Here, the vector data 118 is included within key-value pairs 218 of the IVF-KV index 212. For example, the stream processing engine 210 processes a transaction 120 by converting the transaction data 122 and/or vector data 118 to a key-value pair 218. As shown, the key-value pair 218 includes a key 220 and a value 222. For example, the stream processing engine 210 analyzes the vector data 118 of the transaction to identify which centroid vector 216 the vector data 118 is closest to in the vector space. Furthermore, the stream processing engine encodes key 220 with a cluster identifier (ID) 224 defining a cluster 214 associated with the identified centroid vector 216, e.g., a cluster 214 to which the vector data 118 belongs.

Furthermore, the key 220 includes one or more metadata identifiers (IDs) 226. For example, the transaction data 122 of the transaction 120 can include various metadata about the transaction 120. In the context of a transaction 120 comprising publishing a listing via an online marketplace, for instance, the metadata can include a regional identifier (e.g., defining a regional website of the online marketplace to which the listing is published), one or more categories of the item listed, and/or tags associated with the item listed. Here, the stream processing engine 210 encodes the metadata of the transaction 120 within one or more metadata IDs 226 of the key 220. Moreover, the value 222 of the key-value pair is the vector data 118 (e.g., the vector) associated with the transaction 120.

In summary, the mutable index 126 is an IVF index that is built using a KV structure. In accordance with IVF index functionality, the vector data 118 is partitioned into clusters 214, such that each cluster 214 is defined by a centroid vector 216 and includes the vector data 118 of a plurality of vectors. In accordance KV index functionality, the clusters 214 contain the vector data 118 as values 222 of key-value pairs 218. In addition, a key-value pair 218 includes a key 220 that includes a cluster ID 224 defining a cluster 214 to which the corresponding vector data 118 belongs, and metadata IDs 226 defining metadata associated with the vector data 118. Structuring the mutable index 126 in this manner reduces search latency when searching the mutable index 126. Indeed, as further discussed below with reference to FIG. 3, the cluster ID 224 enables searching the vector data 118 within a corresponding cluster 214, e.g., without searching other clusters 214. Further, the metadata IDs 226 enable filtering the search to be performed only on those clusters 214 or those key-value pairs 218 within a cluster 214 that match metadata of a query vector.

In response to receiving a key-value pair 218, the serving node 202 is configured to index the key-value pair 218 in the IVF-KV index 212. To do so, the serving node 202 extracts the cluster ID 224 from the key 220 of the key-value pair 218, and inserts the key-value pair 218 into the cluster 214 associated with the cluster ID 224. In various implementations, the IVF-KV index 212 and the transaction database 208 are configured with a same indexing structure. For example, both the IVF-KV index 212 and the transaction database 208 are structured as B-tree indexes. Broadly, a B-tree index is a self-balancing tree data structure used in databases to efficiently store and retrieve data in sorted order. B-tree indexes allow for efficient insertion, deletion, and search operations with logarithmic time complexity.

By using a consistent structure, the computational overhead typically associated with data transformation and reorganization during the indexing process is significantly reduced. When new data is ingested into the transaction database 208, for instance, it is already organized in a format that closely aligns with the structure utilized by the IVF-KV index 212. This alignment allows for a more direct and efficient transfer of data when indexing, minimizing the need for complex data restructuring operations, e.g., by the stream processing engine 210 and/or the serving node 202. Ultimately, this structural consistency enables the system 200 to achieve faster indexing latency (e.g., the time between when data is ingested by the transaction database 208 and inserted in the proper format in the mutable index 126) while reducing indexing cost for the system 200, e.g., reducing the computational overhead associated with restructuring the data for indexing.

The processing cluster 206 and the distributed file system 204 work together to perform a delta index build job 230, which corresponds to a portion of the merge operation 134 described earlier. This process occurs periodically, in accordance with the interval 132, to merge vector data 118 from the mutable index 126 into the delta indexes 128. The delta index build job 230 begins by accessing the log archive 228 stored in the distributed file system 204. This log archive 228 contains a record of all transactions 120 (and their corresponding vector data 118 and/or transaction data 122) that have been processed since the last delta index 128 build. The processing cluster 206 retrieves this data from the log archive 228 and processes it for indexing. In particular, the delta index(es) 128 and the full index 130 are HNSW indexes 232, and as such, the processing cluster 206 implements an HNSW algorithm to build the delta index 128. Once the new delta index 128 is built, it is stored back in the distributed file system 204, as shown. The serving node 202 then implements the other portion of the merge operation 134 to load the newly created delta index 128 into the vector database 116, thereby making the delta index 128 available for vector search operations alongside one or more existing delta indexes 128, and/or the full index 130.

Once the delta index build job 230 is complete, the serving node 202 clears the corresponding vector data 118 from the mutable index 126, as this data is now represented in the newly created delta index 128. This clearing process helps maintain the efficiency of the mutable index 126 by keeping its size manageable, ensuring that it can continue to support real-time indexing and low-latency searches on recently added data. In addition, the distributed file system 204 clears the log archive 228 in response to the delta index build job 230 having completed. This ensures that a subsequent delta index build job 230 generates the next delta index 128 on data that is newly ingested since a previous interval 132.

Furthermore, the processing cluster 206 and the distributed file system 204 collaborate to execute a full index build job 236, which corresponds to a portion of the merge operation 138. This process occurs periodically, in accordance with the interval 136, to merge vector data 118 from the delta indexes 128 into the full index 130. The full index build job 236 begins by accessing a vector dataset 234 stored in the distributed file system 204. This vector dataset 234 is a unified dataset of all the vector data 118 indexed by the vector database 116. That is, the vector dataset 234 includes the vector data 118 of a previous version of the full index 130, the vector data 118 of the delta indexes 128 built since a previous full index build job 236, and the vector data 118 of the mutable index 126. In the context of a vector database 116 that stores vector representations of item listings for an online marketplace, the vector dataset 234 includes the vector representations of all item listings as currently listed on the online marketplace. For instance, the vector data 118 in the vector dataset 234 is solely removed when the corresponding listing is removed from the online marketplace.

The processing cluster 206 retrieves this data from the vector dataset 234 and processes it for indexing. As the full index 130 is an HNSW index 232, the processing cluster 206 implements an HNSW algorithm to build the new full index 130. Once the new full index 130 is constructed, it is stored back in the distributed file system 204, as shown. The serving node 202 then implements the other portion of the merge operation 138 to load the newly created full index 130 into the vector database 116, making it available for vector search operations.

After the full index build job 236 is complete, the serving node 202 additionally removes existing delta indexes 128 from the vector database 116, as their data is now represented in the newly created full index 130. In addition, the serving node 202 replaces the existing full index 130 with the newly created full index 130. The periodic execution of the full index build job 236, governed by the interval 136, allows the system to periodically consolidate all vector data into a single full index 130 structured as an HNSW index 232 for increased search latency and scalability. This consolidation and compaction process improves search efficiency of the vector database 116 by reducing the number of indexes that need to be searched and removing redundant and/or duplicated data.

Figure 3:
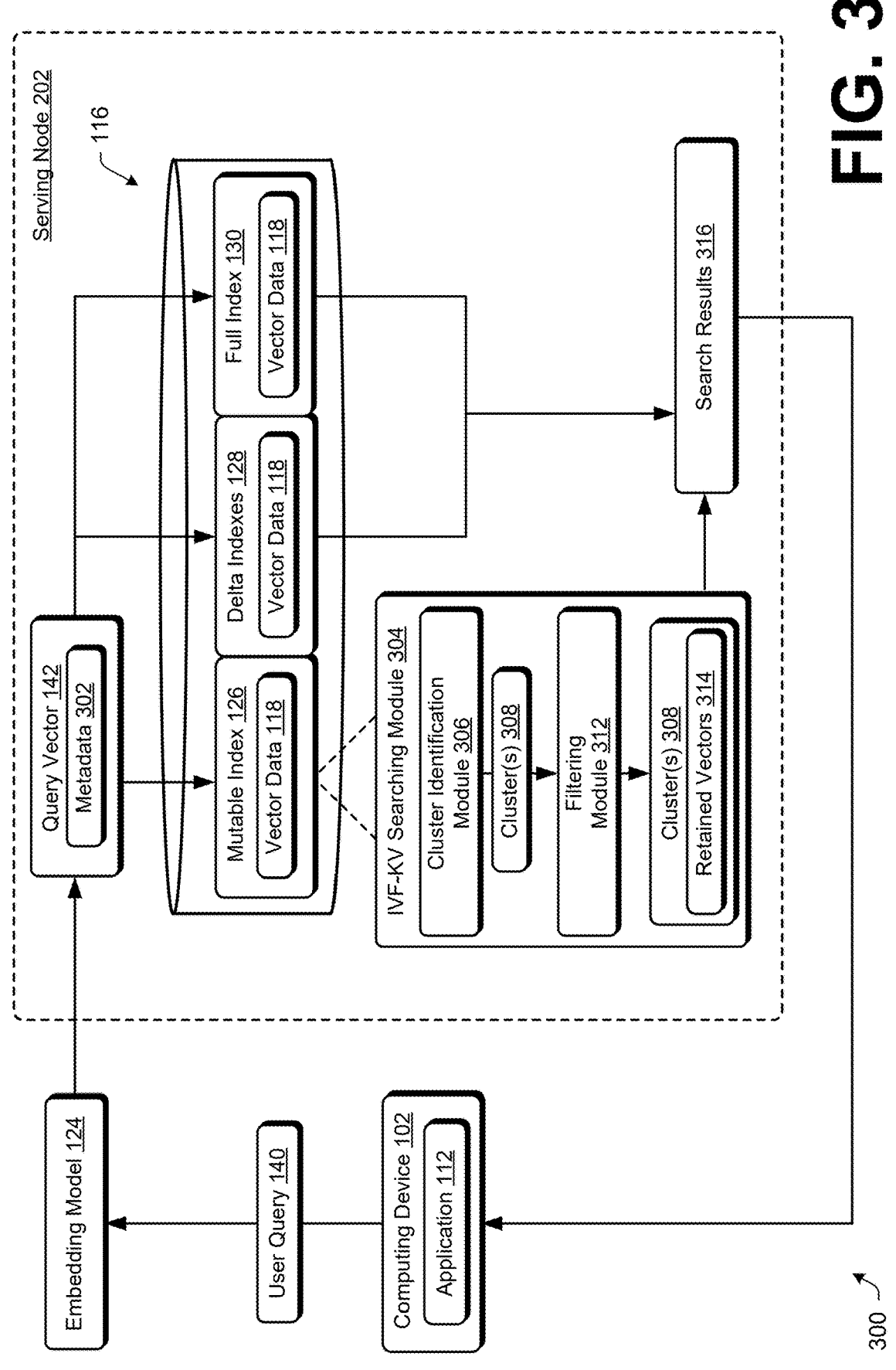
FIG. 3 depicts a system for searching a vector database in accordance with the described techniques.

FIG. 3 depicts a system 300 for searching a vector database in accordance with the described techniques. In the system 300, the computing device 102 submits a user query 140 via search functionality of the digital services 114. The user query 140 is received by the embedding model 124, which processes the user query 140 to generate a query vector 142. In one or more implementations, the user query 140 includes multimodal content (e.g., text, image, video, and/or audio), and the query vector 142 is a vector representation of the multimodal content. In various implementations, the query vector 142 includes metadata 302, as shown. In the context of a user query 140 for item listings in an online marketplace, for instance, the metadata can include a regional or site identifier (e.g., defining a regional website of the online marketplace to which the listing is published), one or more search filters defining categories in which to limit the search, and so on.

Here, the serving node 202 is configured to perform a vector search in the vector database 116 based on the query vector 142. In particular, the serving node 202 concurrently searches the mutable index 126, the delta index(es) 128, and the full index 130, as shown. Generally, the serving node 202 performs the vector search by identifying vectors of the vector data 118 that are proximate to the query vector 142 in the embedding space.

More specifically, the serving node 202 implements an IVF-KV searching module 304 to search the mutable index 126, e.g., the IVF-KV index 212. As part of this, a cluster identification module 306 compares the query vector 142 to the centroid vectors 216 of the plurality of clusters 214. Based on the comparison, the cluster identification module 306 identifies one or more clusters 308 having centroid vectors 216 that are within a threshold distance of the query vector 142 in the vector space.

In addition, a filtering module 312 is configured to filter the vector data 118 in the identified cluster(s) 308 based on a comparison of the metadata 302 of the query vector 142 and the metadata IDs 226 of the vector data 118 in the identified cluster(s) 308. To do so, the filtering module 312 identifies vectors of the vector data 118 in the identified cluster(s) 308 with metadata IDs 226 that match the metadata 302 of the query vector 142.

In the context of regional or site identifiers, for instance, the metadata 302 defines a regional website (e.g., United States) from which the user query 140 originated. In this example, the filtering module 312 identifies the vectors of the vector data 118 having metadata IDs 226 defining regional or site identifiers that match the metadata 302, e.g., which identify the United States as a regional website on which the corresponding listing is hosted.

The identified vectors are referred to as retained vectors 314, since the serving node 202 performs the vector search solely on the retained vectors 314, e.g., and not other vector data 118 within the identified clusters 308. In accordance with functionality of the IVF-KV index 212, the serving node 202 performs a brute force search solely on the retained vectors 314. This is done by comparing the query vector 142 to each of the retained vectors 314 individually to find vectors that are within a threshold distance of the query vector 142.

It is to be appreciated that the order of the cluster identification operation and filtering operation can be reversed in various implementations. For example, the plurality of clusters 214 may be grouped on the basis of metadata IDs 226, e.g., with clusters 214 having a common metadata ID 226 associated with a same group. Given this, the filtering module 312 filters the clusters 214 by identifying one or more groups of clusters 214 associated with a metadata ID 226 that matches the metadata 302 of the query vector 142. Furthermore, the cluster identification module 306 compares the query vector 142 to the centroid vectors 216 of the one or more groups of clusters 214 identified by the filtering module 312. Moreover, the cluster identification module 306 identifies one or more clusters 308 within the one or more groups of clusters having centroid vectors 216 that are within a threshold distance of the query vector 142 in the vector space. Here, the serving node performs the brute force search on solely the vector data 118 in the identified clusters 308. As further discussed below, this cluster identification functionality and metadata-based filtering is facilitated via sharding techniques in one or more implementations.

To search the delta indexes 128 and the full index 130 configured as HNSW indexes 232, the serving node 202 employs a different approach tailored to the graph-based structure of these indexes. HNSW (Hierarchical Navigable Small World) indexes are designed for efficient approximate nearest neighbor search. Accordingly, the vector search in the indexes 128, 130 involves performing an approximate nearest neighbor (ANN) search in the indexes 128, 130, in part, by traversing the graph structures.

In response completing the searches in the mutable index 126, delta indexes 128, and full index 130, the serving node 202 aggregates the results to produce a comprehensive set of nearest neighbors for the query vector 142. In some examples, the aggregation process involves combining the vector data 118 identified from each index and ranking the vectors based on their similarity to the query vector 142. In some implementations, the serving node 202 retrieves non-vector data corresponding to the vectors obtained as a result of the search. In variations, the corresponding non-vector data is stored alongside the vector data 118 in the vector database 116, or the corresponding non-vector data is retrieved from a different database of the system 300. In the context of the vector database 116 storing vector data 118 of item listings, the non-vector data includes the item listings encoded by the vector data 118, for example. The non-vector data is aggregated as search results 316, which are returned to computing device 102, e.g., for display in a user interface of the application 112.

The described techniques separate the indexing and searching workloads. Indeed, indexing operations of the HNSW indexes 232 (e.g., building the delta indexes 128 and the full index 130), which are computationally intensive and time-consuming, are performed by the processing cluster 206 within the offline distributed computing environment 106. By offloading these operations to a processing cluster 206, the vector database management system 108 can leverage distributed computing techniques to efficiently process large volumes of vector data 118 without impacting the performance of search operations. In contrast, search operations are primarily handled by the serving node 202, which is optimized for low-latency query processing. While the serving node 202 is responsible for some real-time indexing operations of the mutable index 126, these operations have minimal indexing cost. This is because the encoding of the key-value pair 218 is performed by the stream processing engine 210, and as such, the serving node 202 is solely responsible for placing the key-value pair 218 in the appropriate cluster 214. This separation allows the serving node 202 to focus on maintaining high query performance and low search latency, while offloading computationally-intensive and memory-intensive tasks to the offline distributed computing environment for increased scalability.

In addition, the vector database management system 108 employs a disaggregated storage-compute architecture, which separates the storage and computational aspects of vector indexing and searching. The disaggregated storage-compute architecture is characterized by the separation of data storage, handled by the distributed file system 204, from computational tasks performed by the processing cluster 206 to build the HNSW indexes 232. This separation allows for independent scaling of storage and compute resources, enabling the system to efficiently handle large-scale vector datasets and complex indexing operations.

In one or more implementations, sharding is a technique employed by the vector database management system 108 to partition the vector data 118 across multiple servers or nodes, e.g., a plurality of serving nodes 202. Sharding involves dividing a large dataset into smaller, more manageable pieces called shards, and distributing the shards across multiple database servers. This approach enables the vector database 116 to distribute the computational load and storage requirements across multiple machines, thereby improving scalability, performance, and fault tolerance.

In one or more implementations, the vector database management system 108 employs various sharding algorithms to distribute the vector data 118 across shards. In some examples, the vector database management system 108 employs the use of sharding keys while executing the sharding algorithms. Notably, a sharding key includes or corresponds to data organized into one or more fields that control how vector data 118 is distributed across shards in the vector database 116. In various examples, the sharding keys of the vector data 118 correspond to the keys 220 of the key-value pairs, but sharding keys can be built for the vector data 118 in other manners without departing from the spirit or scope of the described techniques.

Metadata-based sharding algorithms utilize metadata associated with the vectors to determine their placement. Hash sharding, for instance, applies a hash function to a specific metadata field (e.g., a metadata ID 226) within a sharding key of a vector to determine which shard the vector belongs to. While this approach, in most cases, provides even data distribution, it may lead to a "hot-hash sharding key" problem where certain hash keys receive disproportionately high traffic. This can overload the underlying computational resources of the shard.

Range sharding, on the other hand, divides the vector data 118 data based on a range of values (e.g., date ranges or alphabetical ranges of item names) in a particular metadata field, e.g., the metadata IDs 226. In this context, distinct sub-ranges within the range of values are associated with a unique shard key (e.g., within the metadata IDs 226), which determines which shard the vector data 118 belongs to. This approach maintains order, and as such, can be beneficial for range-based queries. In addition, range sharding eliminates the hot-hash sharding key problem. To prevent uneven data distribution, the vector database management system 108 re-balances range-based shards periodically or in response to identifying an uneven data distribution across shards, e.g., a size of a largest range-based shard exceeding the size of a smallest range-based shard by a predetermined amount.

Vector-based sharding algorithms, such as clustering-based sharding, distribute vector data 118 across shards based on their proximity in the vector space. In this approach, the vector database management system 108 employs a clustering algorithm (e.g., k-means clustering) to generate clusters of the vector data 118 in the vector database 116, such that each cluster is associated with a centroid vector. In various examples, the clustering algorithm is applied to the mutable index 126, as previously discussed to generate the clusters 214 each having a centroid vector 216. Additionally or alternatively, the clustering algorithm is similarly applied to the vector data 118 in the delta index(es) 128 and the full index 130 to generate clusters of vector data 118 in these indexes. In one or more implementations, each cluster is assigned to a respective shard.

The IVF-KV searching module 304 leverages these sharding strategies during the search process, as previously mentioned. For example, metadata-based sharding algorithms (e.g., hash sharding and/or range sharding) are employed to assign the vector data 118 to groups of shards. Each group of shards may be associated with a particular metadata ID 226. During the search, the filtering module 312 identifies one or more groups of shards with a particular metadata ID 226 that matches the metadata 302 of the query vector 142. Further, the cluster identification module 306 identifies one or more clustering-based shards having centroid vectors 216 that are within a threshold distance of the query vector 142, and performs the clustering on the one or more clustering-based shards.

It should be noted that the sharding techniques are applied in a unified manner. That is, any one or any combination of sharding techniques (e.g., including those mentioned above and those not specifically mentioned herein) are applied to each of the mutable index 126, the delta indexes 128, and the full index 130.

In various implementations, the vector database management system 108 employs various quantization techniques to compress vector data 118 and reduce memory consumption by the vector database 116. Quantization is a vector reduction/compression process that works by mapping a large set of input values (e.g., a vector) to a smaller set of output values (e.g., a compressed vector), effectively reducing the precision of the data while maintaining its essential characteristics. Examples quantization techniques include, but are not limited to, product quantization, binary quantization, and scalar quantization. By implementing these quantization techniques, the vector database management system 108 can significantly reduce the storage footprint of the vector data 118, which also improves search latency.

As part of the quantization process, the vector database management system 108 quantizes the incoming vector data 118 during indexing, and also quantizes the query vector 142 during search operations. For example, the stream processing engine 210 and/or the serving node 202 quantizes incoming vector data 118 for indexing into the mutable index 126. Further, the processing cluster 206 quantizes the vector data 118 during the delta index build job 230 and the full index build job 236. Thus, the vector data 118 stored in the vector database 116 includes or corresponds to compressed vector data 118 as compressed by one or more quantization algorithms. Furthermore, the serving node 202 quantizes the query vector 142 during the vector search operation, e.g., to enable comparison of the vectors in a same compressed format.

Although the mutable index 126, the delta index(es) 128, and the full index 130 are depicted and described herein as a unified vector database 116 in which the indexes 126, 128, 130 are concurrently searched, this is not to be construed as limiting. Rather, any one of the indexes 126, 128, 130 are implementable as a standalone database, and/or any combination of two or more of the indexes 126, 128, 130 are implementable as a unified vector database 116. Thus, the vector database 116 is implemented with any one or any combination of the above-described indexes 126, 128, 130 without departing from the spirit or scope of the described techniques.

Figure 4:
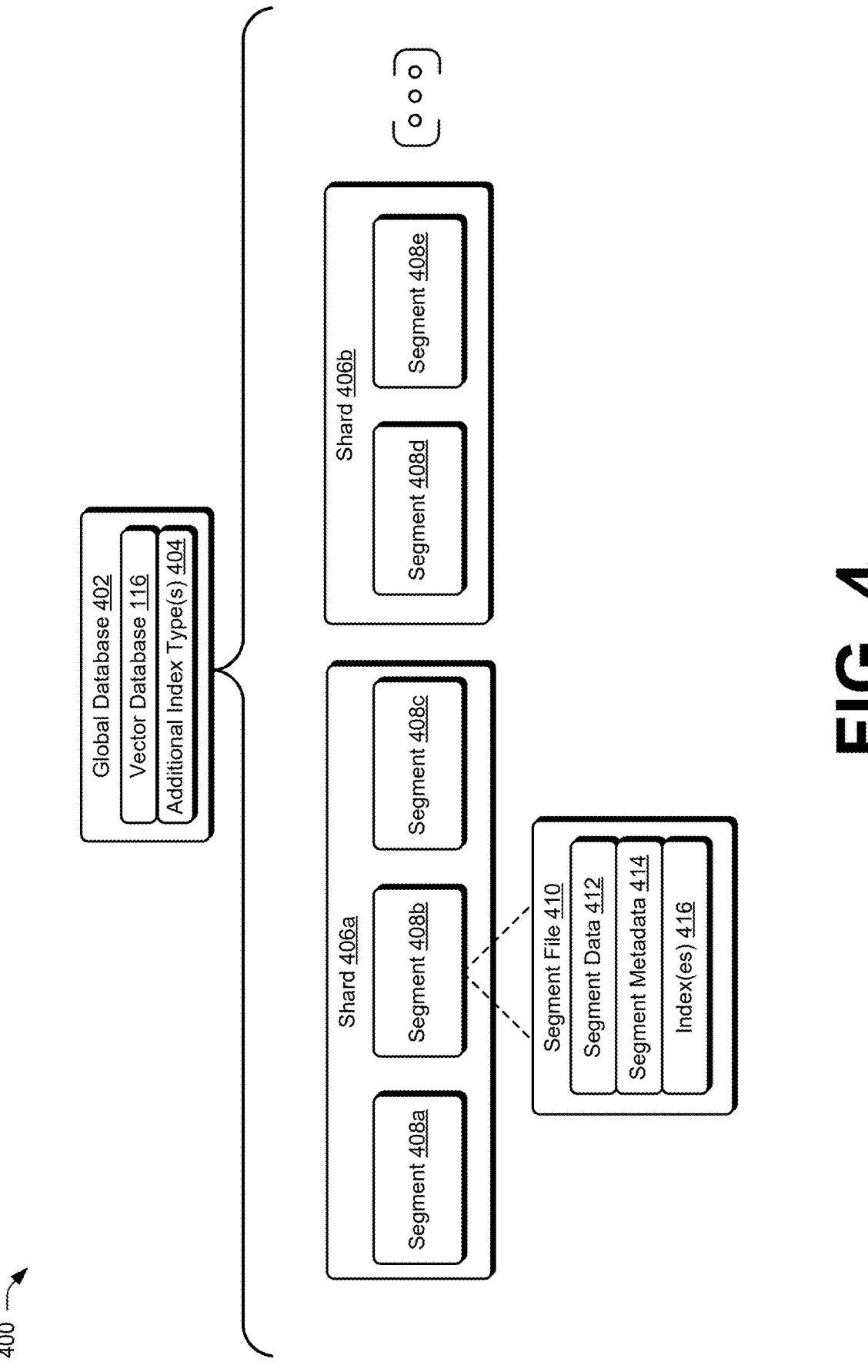
FIG. 4 depicts an example of a global database that integrates the vector database of the described techniques.

FIG. 4 depicts an example 400 of a global database 402 that integrates the vector database 116 of the described techniques. Here, the service provider system 104 integrates the vector database 116 into a global database 402. As shown, the global database 402 includes the vector database 116 (e.g., having the mutable index 126, the delta index(es) 128, and the full index 130), and at least one additional index type 404. Examples of the additional index types 404 include, but are not limited to, additional vector indexes, B-tree indexes, keyword indexes, full-text indexes, inverted indexes, and the like. In various examples, the same data (e.g., the vector data 118) is represented in different formats (e.g., non-vectorized data) in different indexes of the global database 402.

The previously described sharding techniques are similarly applied to the data maintained in the global database 402 in a unified manner. For example, the data of the global database 402 is distributed across a plurality of shards, such as shard 406*a* and shard 406*b*. Each shard 406*a*, 406*b* includes the vector data 118 indexed in the vector database 116 in accordance with the described techniques. In addition, one or more of the shards include the vector data 118 and/or corresponding non-vector data indexed via at least one additional index type 404.

Any one or any combination of sharding techniques (e.g., including those mentioned above and those not specifically mentioned herein) are applicable to distribute the data of the global database 402 across the shards 406*a*, 406*b*. In the example 400, the data within each shard 406*a*, 406*b* is partitioned into one or more segments (e.g., segments 408*a*, 408*b*, 408*c*, 408*d*, 408*e*) based on metadata of the indexed data stored within the global database 402.

In one example in which the global database 402 stores item listings published via an online marketplace, the shards represent different item categories (e.g., generated via hash sharding techniques), and the segments represent alphabetical ranges of item titles of the items within the item categories, e.g., generated using range sharding and/or partitioning techniques. For instance, the shard 406*a* stores item listings in the "electronics" category, the segment 408*a* stores item titles within the "electronics category" and beginning with an alphabetical letter within the range a-i, the segment 408*b* stores item titles within the "electronics category" and beginning with an alphabetical letter within the range j-r, and the segment 408*c* stores item titles within the "electronics category" and beginning with an alphabetical letter within the range s-z. This example, however, is not to be construed as limiting. Instead, the global database 402 can partition the data across shards and segments in any suitable manner without departing from the spirit or scope of the described techniques.

In some implementations, each segment is represented by a segment file 410 of the segment. The segment file 410 includes the segment data 412 of the segment, e.g., the data that is indexed and searchable by users of the global database 402. The segment data 412, for example includes the vector data 118 and/or the corresponding non-vector data, such as full text content and/or keywords. In addition, the segment file 410 includes segment metadata 414 describing information about the type of content in the segment. For example, the segment metadata 414 defines that the segment data 412 includes item listings in the electronics category and having item titles starting with an alphabetical letter within the range j-r. Moreover, the segment file 410 includes one or more indexes 416 by which the segment data 412 is indexed, such as the IVF-KV index 212, the HNSW indexes 232, and at least one additional index type 404.

In this way, the service provider system 104 is able to leverage the segment metadata 414 and types of indexes 416 to filter the search, and perform a search using a type of index 416 most suitable for the user query 140. For example, the service provider system 104 receives the user query 140. Based on metadata 302 of the user query 140, the query vector 142, and/or the segment metadata 414, the service provider system 104 limits the search to particular shards and/or particular segments within the shards. Furthermore, the service provider system 104 selects, based on content and/or features of the user query 140 and/or the query vector 142, one or more of the indexes 416 in which to perform the search.

In summary, the described techniques include functionality for integrating the vector database 116 within a global database 402. The global database 402 indexes the data (e.g., the vector data 118 and/or corresponding non-vector data, such as text, and/or keywords) in the indexes of the vector database 116, and at least one additional index type 404. This allows the data to be searched using the vector database 116 and its corresponding indexes, as well as the additional index type(s) 404. This integrated approach allows for versatile searching capabilities across different data types and indexing structures within a unified database system, leveraging the strengths of various indexing methods to optimize search performance for different query types and data characteristics.

Example Procedures

This section describes examples of procedures for a hybrid vector database. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 5 depicts a procedure 500 in an example implementation of real-time vector indexing and searching in a mutable index and one or more immutable graph-based indexes. Vector data to be inserted into a vector database is obtained (block 502). By way of example, the vector database management system 108 receives a transaction 120 from a computing device 102, and converts transaction data 122 of the transaction 120 to vector data 118 using the embedding model 124. In accordance with the described techniques, the vector data 118 is to be inserted into the vector database 116.

The vector data is indexed into a mutable index of the vector database that supports real-time vector indexing (block 504). For example, the serving node 202 indexes the vector data 118 into the mutable index 126 of the vector database 116. In some examples, the mutable index 126 is an inverted file index maintained as a key-value store (e.g., the IVF-KV index 212), with the inverted file index divided into a plurality of clusters 214 each including the vector data 118 of a plurality of vectors and a centroid vector 216. As part of the indexing process, the stream processing engine 210 consumes the transaction 120 logged in the transaction database 208, and encodes the transaction 120 as a key-value pair 218. The key-value pair 218 includes a value 222 representing the vector (e.g., vector data 118) of the transaction 120. In addition, the key-value pair 218 includes a key 220 having a cluster ID 224 identifying a cluster 214 to which the vector belongs, and one or more metadata IDs 226 identifying metadata associated with the vector. The serving node 202 receives the key-value pair 218 and inserts the key-value pair 218 into the appropriate cluster 214.

The vector data from the mutable index is periodically merged into one or more immutable graph-based indexes (block 506). By way of example, the processing cluster 206 performs a delta index build job 230 periodically in accordance with a first interval 132. To do so, the processing cluster 206 receives a log archive 228 which contains a record of all transactions 120 (and their corresponding vector data 118 and/or transaction data 122) that have been processed since the last delta index 128 build. Further, the processing cluster 206 processes the log archive 228 to build a delta index 128 (e.g., an HNSW index), and stores it at the distributed file system 204. The serving node 202 then loads the delta index 128 from the distributed file system 204 into the vector database 116. Additionally, the processing cluster 206 performs a full index build job 236 periodically in accordance with a second interval 136, e.g., which is longer than the first interval 132. To do so, the processing cluster 206 receives a vector dataset 234, which is a unified dataset of all the vector data 118 indexed by the vector database 116. Further, the processing cluster 206 processes the vector dataset 234 to build a full index 130 (e.g., an HNSW index), and stores it at the distributed file system 204. The serving node 202 then loads the full index 130 from the distributed file system 204 into the vector database 116.

A query vector is received (block 508). For example, the vector database management system 108 receives a user query 140 from the computing device 102, and converts the user query 140 to a query vector 142 using the embedding model 124.

A vector search is performed in the mutable index and the one or more immutable graph-based indexes based on the query vector (block 510). By way of example, the serving node 202 concurrently performs a vector search in the mutable index 126, the delta indexes 128, and the full index 130 based on the query vector 142.

FIG. 6 illustrates a procedure 600 in an example implementation of real-time vector indexing and searching in a mutable index. Vector data is obtained for insertion into a mutable database that supports real-time vector indexing, the mutable index is structured as an inverted file index maintained as a key-value store and divided into a plurality of clusters each including a plurality of vectors and a centroid vector (block 602). By way of example, the vector database management system 108 obtains vector data 118 of one or more vectors to be inserted in the mutable index 126. In some implementations, the mutable index 126 is an inverted file index maintained as a key-value store, e.g., an IVF-KV index 212. The IVF-KV index 212 is divided into a plurality of clusters 214 each including the vector data 118 of a plurality of vectors and a centroid vector 216.

The vector data is indexed into the mutable index (block 604). As part of this, key-value pairs are determined for each vector of the vector data, where each key-value pair includes a key that identifies metadata associated with the vector and the cluster to which the vector belongs (block 606). For example, the stream processing engine 210 consumes transactions 120 logged in the transaction database 208, and encodes the transactions 120 as key-value pairs 218. Each key-value pair 218 represents a transaction, such that a value 222 of the key-value pair 218 includes a vector (e.g., vector data 118) representing the transaction data 122 of the transaction 120. In addition, each key-value pair 218 includes a key 220 having a cluster ID 224 identifying a cluster 214 to which the vector belongs, and one or more metadata IDs 226 identifying metadata associated with the vector. The serving node 202 receives the key-value pair 218 and inserts the key-value pair into the appropriate cluster 214. In various implementations, the mutable index 126 and the transaction database 208 are configured with a same indexing structure, e.g., a B-tree index.

A query vector is received (block 608). For example, the vector database management system 108 receives a user query 140 from the computing device 102, and converts the user query 140 to a query vector 142 using the embedding model 124.

A vector search is performed in the mutable index based on the query vector (block 610). As part the vector search, one or more clusters are identified from the plurality of clusters based on distances between the query vector and centroid vectors of the clusters (block 612). By way of example, the cluster identification module 306 identifies one or more clusters 308 having centroid vectors 216 that are within a threshold distance of the query vector 142.

As part of the vector search, one or more vectors are filtered from the one or more clusters based on a comparison of the metadata of the vectors in the one or more clusters and additional metadata of the query vectors, resulting in a plurality of retained vectors of the one or more clusters (block 614). For example, the filtering module 312 filters vectors (e.g., vector data 118) from the identified cluster(s) 308, resulting in a plurality of retained vectors 314 within the identified cluster(s) 308. The retained vectors 314, for instance, are associated with metadata IDs 226 that match the metadata 302 of the query vector 142.

As part of the vector search, a brute force search is performed by comparing the query vector to the plurality of retained vectors (block 616). By way of example, the serving node 202 performs a brute force search on solely the retained vectors 314 of the identified cluster(s) 308, e.g., while refraining from searching other clusters 214 and other vectors within the identified cluster(s) 308.

Having described examples of procedures in accordance with one or more implementations, consider now an example of a system and device that can be utilized to implement the various techniques described herein.

Example System and Device

FIG. 7 illustrates an example of a system generally at 700 that includes an example of a computing device 702 that is representative of one or more computing systems and/or devices that may implement the various techniques described herein. This is illustrated through inclusion of the application 112 and the vector database management system 108. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random-access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). In accordance with the described techniques, the memory/storage 712 includes the vector database 116 and/or the global database 402. The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

In some aspects, the techniques described herein relate to a method implemented by at least one computing device, the method including: obtaining vector data to be inserted into a vector database; indexing the vector data into a mutable index of the vector database that supports real-time vector indexing; periodically merging the vector data from the mutable index into one or more immutable graph-based indexes; receiving a query vector; and performing a vector search in the mutable index and the one or more immutable graph-based indexes based on the query vector.

In some aspects, the techniques described herein relate to a method, wherein the one or more immutable graph-based indexes include one or more delta indexes and a full index, the periodically merging including: periodically merging, in accordance with a first interval, the vector data from the mutable index into the one or more delta indexes; and periodically merging, in accordance with a second interval, the vector data from the one or more delta indexes into the full index.

In some aspects, the techniques described herein relate to a method, wherein the vector data of the mutable index and the one or more immutable graph-based indexes is persisted in a distributed file system by an offline distributed computing environment, and the one or more immutable graph-based indexes are built by the offline distributed computing environment using the vector data persisted in the distributed file system.

In some aspects, the techniques described herein relate to a method, wherein the one or more immutable graph-based indexes are Hierarchical Navigable Small World (HNSW) indexes.

In some aspects, the techniques described herein relate to a method, wherein the mutable index is an inverted file index maintained as a key-value store, the inverted file index divided into a plurality of clusters each including a plurality of vectors and a centroid vector.

In some aspects, the techniques described herein relate to a method, wherein indexing the vector data in the mutable index includes generating key-value pairs for each vector of the vector data, wherein a key-value pair of a vector includes a key identifying metadata associated with the vector and a cluster to which the vector belongs.

In some aspects, the techniques described herein relate to a method, wherein performing the vector search includes: identifying one or more clusters of the plurality of clusters based on distances between the query vector and one or more centroid vectors of the one or more clusters; filtering, from the one or more clusters, one or more vectors based on a comparison of the metadata of the vectors in the one or more clusters and additional metadata of the query vector, resulting in a plurality of retained vectors of the one or more clusters; and performing a brute force search by comparing the query vector to the plurality of retained vectors.

In some aspects, the techniques described herein relate to a method, further including compressing, using quantization techniques, vectors of the vector data for storage in the vector database.

In some aspects, the techniques described herein relate to a method, further including storing the vector data in a transaction database, wherein indexing the vector data in the mutable index includes transferring the vector data to the mutable index, the transaction database and the mutable index configured with a same indexing structure.

In some aspects, the techniques described herein relate to a method, further including integrating the vector database within a global database in which the vector data is searchable using the mutable index, the one or more immutable graph-based indexes, and at least one additional index type.

In some aspects, the techniques described herein relate to a method, further including: clustering the vector data based on proximity within a vector space; and distributing the vector data across a plurality of shards of the vector database based on at least one of metadata associated with the vector data and clusters to which the vector data belongs.

In some aspects, the techniques described herein relate to a system including: one or more processors; and memory storing instructions that, when executed by the one or more processors, cause the system to: obtain vector data to be inserted into a vector database; index the vector data into a mutable index of the vector database that supports real-time vector indexing; periodically merge the vector data from the mutable index into one or more immutable graph-based indexes; receive a query vector; and perform a vector search in the mutable index and the one or more immutable graph-based indexes based on the query vector.

In some aspects, the techniques described herein relate to a system, wherein the one or more immutable graph-based indexes include one or more delta indexes and a full index, the instructions further causing the system to: periodically merge, in accordance with a first interval, the vector data from the mutable index into the one or more delta indexes; and periodically merge, in accordance with a second interval, the vector data from the one or more delta indexes into the full index.

In some aspects, the techniques described herein relate to a system, wherein the vector data of the mutable index and the one or more immutable graph-based indexes is persisted in a distributed file system by an offline distributed computing environment, and the one or more immutable graph-based indexes are built by the offline distributed computing environment using the vector data persisted in the distributed file system.

In some aspects, the techniques described herein relate to a system, wherein the one or more immutable graph-based indexes are Hierarchical Navigable Small World (HNSW) indexes.

In some aspects, the techniques described herein relate to a system, wherein the mutable index is an inverted file index maintained as a key-value store, the inverted file index divided into a plurality of clusters each having a plurality of vectors and a centroid vector.

In some aspects, the techniques described herein relate to a system, wherein the instructions further cause the system to generate key-value pairs for each vector of the vector data, wherein a key-value pair of a vector includes a key identifying metadata associated with the vector and a cluster to which the vector belongs.

In some aspects, the techniques described herein relate to a system, wherein the instructions further cause the system to: filter, from the plurality of clusters, at least one cluster based on a comparison of the metadata of the vectors in the plurality of clusters and additional metadata of the query vector, resulting in multiple retained clusters; identify one or more clusters of the multiple retained clusters based on distances between the query vector and one or more centroid vectors of the one or more clusters; perform a brute force search by comparing the query vector to the vectors within the one or more clusters.

In some aspects, the techniques described herein relate to a system, wherein the instructions further cause the system to compress, using quantization techniques, vectors of the vector data for storage in the vector database.

In some aspects, the techniques described herein relate to one or more non-transitory computer-readable media storing instructions that, when executed by one or more processors, cause the one or more processors to perform operations including: obtaining vector data to be inserted into a vector database; indexing the vector data into a mutable index of the vector database that supports real-time vector indexing; periodically merging the vector data from the mutable index into one or more immutable graph-based indexes; receiving a query vector; and performing a vector search in the mutable index and the one or more immutable graph-based indexes based on the query vector.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by at least one computing device, the method comprising:
   obtaining vector data to be inserted into a vector database;
   indexing the vector data into a mutable index of the vector database by generating one or more key-value pairs for each vector of the vector data;
   periodically merging, in accordance with a first interval, the vector data from the mutable index into a first immutable index;
   periodically merging, in accordance with a second interval, the vector data from the first immutable index into a second immutable index;
   receiving a query vector; and
   performing a vector search in at least one of the mutable index, the first immutable index, and the second immutable index based on the query vector.

2. The method of claim 1, wherein the vector data of the mutable index, the first immutable index, and the second immutable index is persisted in a distributed file system by an offline distributed computing environment, and the first and second immutable indexes are built by the offline distributed computing environment using the vector data persisted in the distributed file system.

3. The method of claim 1, wherein the first immutable index and the second immutable index are Hierarchical Navigable Small World (HNSW) indexes.

4. The method of claim 1, wherein the mutable index is an inverted file index maintained as a key-value store, the inverted file index divided into a plurality of clusters each including a plurality of vectors and a centroid vector.

5. The method of claim 4, wherein a key-value pair of a vector includes a key identifying metadata associated with the vector and a cluster to which the vector belongs.

6. The method of claim 5, wherein performing the vector search includes:

identifying one or more clusters of the plurality of clusters based on distances between the query vector and one or more centroid vectors of the one or more clusters;

filtering, from the one or more clusters, one or more vectors based on a comparison of the metadata of the vectors in the one or more clusters and additional metadata of the query vector, resulting in a plurality of retained vectors of the one or more clusters; and performing a brute force search by comparing the query vector to the plurality of retained vectors.

7. The method of claim 1, further comprising compressing, using quantization techniques, vectors of the vector data for storage in the vector database.

8. The method of claim 1, further comprising storing the vector data in a transaction database, wherein indexing the vector data in the mutable index includes transferring the vector data to the mutable index, the transaction database and the mutable index configured with a same indexing structure.

9. The method of claim 1, further comprising integrating the vector database within a global database in which the vector data is searchable using the mutable index, the first immutable index, the second immutable index, and at least one additional index type.

10. The method of claim 1, further comprising:

clustering the vector data based on proximity within a vector space; and distributing the vector data across a plurality of shards of the vector database based on at least one of metadata associated with the vector data and clusters to which the vector data belongs.

11. The method of claim 1, wherein each first mutable index is built from the vector data accumulated during a respective interval and excludes the vector data accumulated in the mutable index during other intervals.

12. The method of claim 1, wherein the vector search is concurrently performed in the mutable index, the first immutable index, and the second immutable index.

13. A system comprising:

one or more processors; and memory storing instructions that, when executed by the one or more processors, cause the system to:

obtain vector data to be inserted into a vector database;

index the vector data into a mutable index of the vector database by generating one or more key-value pairs for each vector of the vector data;

periodically merge, in accordance with a first interval, the vector data from the mutable index into a first immutable index;

periodically merge, in accordance with a second interval, the vector data from the first immutable index into a second immutable index;

receive a query vector; and perform a vector search in the mutable index, the first immutable index, and the second immutable index based on the query vector.

14. The system of claim 13, wherein the vector data of the mutable index, the first immutable index, and the second immutable index is persisted in a distributed file system by an offline distributed computing environment, and the first and second immutable indexes are built by the offline distributed computing environment using the vector data persisted in the distributed file system.

15. The system of claim 13, wherein the first immutable index and the second immutable index are Hierarchical Navigable Small World (HNSW) indexes.

16. The system of claim 13, wherein the mutable index is an inverted file index maintained as a key-value store, the inverted file index divided into a plurality of clusters each having a plurality of vectors and a centroid vector.

17. The system of claim 16, wherein a key-value pair of a vector includes a key identifying metadata associated with the vector and a cluster to which the vector belongs.

18. The system of claim 17, wherein the instructions further cause the system to:

filter, from the plurality of clusters, at least one cluster based on a comparison of the metadata of the vectors in the plurality of clusters and additional metadata of the query vector, resulting in multiple retained clusters;

identify one or more clusters of the multiple retained clusters based on distances between the query vector and one or more centroid vectors of the one or more clusters; and perform a brute force search by comparing the query vector to the vectors within the one or more clusters.

19. The system of claim 13, wherein the instructions further cause the system to compress, using quantization techniques, vectors of the vector data for storage in the vector database.

20. One or more non-transitory computer-readable media storing instructions that, when executed by one or more processors, cause the one or more processors to perform operations including:

obtaining vector data to be inserted into a vector database;

indexing the vector data into a mutable index of the vector database by generating one or more key-value pairs for each vector of the vector data;

periodically merging, in accordance with a first interval, the vector data from the mutable index into a first immutable index;

periodically merging, in accordance with a second interval, the vector data from the first immutable index into a second immutable index;

receiving a query vector; and performing a vector search in the mutable index, the first immutable index, and the second immutable index based on the query vector.

* * * * *